United States Patent [19]

Akado et al.

[11] 4,178,898

[45] Dec. 18, 1979

[54] THERMOSTATIC VALVE FOR INTAKE AIR TEMPERATURE COMPENSATION FOR INTERNAL COMBUSTION ENGINE

[75] Inventors: Hajime Akado, Anjo; Yoshiro Uchida, Toyota; Kenichi Kubota, Kariya; Toshiharu Hasebe, Kariya; Akihide Yamaguchi, Kariya; Tsutomu Tomita, Okazaki; Suminobu Ootsubo, Toyota, all of Japan;

[73] Assignee: Nippondenso Co., Ltd., Kariya; Toyota Jidosha Kogyo Kabushiki Kaisha, Toyota, both of Japan

[21] Appl. No.: 921,566

[22] Filed: Jul. 3, 1978

[30] Foreign Application Priority Data

Jul. 21, 1977 [JP] Japan .................... 52-98059[U]

[51] Int. Cl.² ............... F02M 31/00; G05D 23/00
[52] U.S. Cl. .................. 123/122 D; 123/122 H; 236/86
[58] Field of Search ............ 123/122 D, 122 H; 236/101 C, 86; 251/11

[56] References Cited

U.S. PATENT DOCUMENTS

| | | | |
|---|---|---|---|
| 3,394,687 | 7/1968 | Scott | 123/122 D |
| 3,918,421 | 11/1975 | Berry | 123/122 D |

*Primary Examiner*—Ronald H. Lazarus
*Attorney, Agent, or Firm*—Cushman, Darby & Cushman

[57] ABSTRACT

A thermostatic valve for intake air temperature compensation for an internal combustion engine includes a housing formed with first, second, and third openings leading, respectively, to the atmosphere, a negative pressure motor, and the intake manifold of the engine. To this housing is secured a temperature sensor including a piston rod to be actuated by a thermally expandable element whose volume increases or decreases with a change in temperature. A valve element to be moved into and out of contact with a valve seat by the piston rod of the temperature sensor is accommodated in a casing. Inside the casing a holed partition member is disposed between the first and third openings and between the second and third openings, and a check valve designed to open in one direction only is located between the partition member and the third opening.

5 Claims, 11 Drawing Figures

THERMOSTATIC VALVE FOR INTAKE AIR TEMPERATURE COMPENSATION FOR INTERNAL COMBUSTION ENGINE

BACKGROUND OF THE INVENTION

This invention relates to a device for automatically controlling the temperature of intake air for an internal combustion engine, and more particularly to a thermostatic valve of a construction, as disclosed in our copending U.S. patent application Ser. No. 739,190, which serves dual functions; sensing a change in temperature of the engine room or the like and controlling the quantity of intake air supply to the engine proportionally according to the temperature change, and also controlling a negative pressure motor so as to proportion cold and hot air in a mixture being supplied to the carburetor of the engine or switch from cold air supply to hot air supply or vice versa, in response to the temperature change and to the negative pressure in the intake manifold space downstream of the throttle valve of the engine.

For use with internal combustion engines of automobiles and the like, a thermostatic valve has already been proposed which combines, in a unitary construction, a thermostatic valve for sensing the temperature of the intake air being supplied to the carburetor when the air temperature is low, especially in winter, and allowing the negative pressure in the intake manifold space downstream of the throttle valve to act upon a negative pressure motor according to the intake air temperature sensed, thereby controlling the motor so as to adjust the cold and hot air supply to the carburetor, with another thermostatic valve which, when the atmospheric temperature is high, for example in summer, particularly during idling, enables additional air to be supplied to the intake manifold lest the gaseous mixture in the manifold become overrich.

The conventional thermostatic valve just described uses one or more bimetals as the temperature sensor and actuator. For the control over the broad temperature range, from low to high temperatures, each bimetal must be of very large dimensions. Accordingly the increased weight and size raise the cost of the element. Moreover, under vibratory conditions, the bimetal exhibits a serious disadvantage of errorneous functioning due to vibration.

A further important disadvantage of the thermostatic valve has been that, because the control of cold and hot air supply to the carburetor is effected by allowing the negative pressure in the intake manifold space downstream of the throttle valve to act upon the negative pressure motor, the negative pressure in the intake manifold can drop during full-load running in a cold season, for example, below the level for the motor to permit the hot air supply, resulting in cold air intake and even icing of the carburetor.

A thermostatic valve of a type using a thermally expandable element whose volume changes with the temperature has also been proposed. It comprises a cylindrical valve body and a piston-like valve element disposed therein to be actuated by the expansion of the thermally expandable element, so that the air flow into the negative pressure motor and the intake manifold is controlled by the sliding motion of the valve element in the valve body. In order that the valve element may slide smoothly within the valve body, a small clearance must be provided between the outer surface of the element and the inner surface of the valve body. This clearance can in some cases admit excess air to the negative pressure motor and the intake manifold. After an extended period of the clearance sometimes grows so large that the manifold may no longer exert a negative pressure upon the motor. This leads to a major disadvantage of unreliability in performance.

SUMMARY OF THE INVENTION

It is, therefore, an object of the present invention to provide a thermostatic valve which, in order to overcome the foregoing difficulties, comprises a housing formed with a first opening or openings communicated with the atmosphere, a second opening communicated with a negative pressure motor, and a third opening communicated with the intake manifold, a temperature sensor secured to the housing and having a piston rod to be actuated by a thermally expandable element whose volume increases or decreases with a temperature change, a valve element located in a casing to be actuated by the piston rod of the temperature sensor into and out of contact with a valve seat, a holed partition member disposed inside the casing and between the first and third openings and between the second and third openings, a check valve located between the partition member and the third opening and adapted to open in one direction only, a first passageway connecting the second and third openings through the holes of the partition member so that, when the negative pressure in the intake manifold acting on the check valve is high, the passageway is opened by opening of the check valve and, when the negative pressure on the check valve becomes lower than that in the second opening, the passageway is closed by the check valve, a second passageway connecting the first and second openings, and a third passageway connecting the first and third openings through the holes of the partition member, the second and third passageways being opened and closed by the valve element in such a way that, while the intake air temperature is low, the element is in contact with the valve seat, closing the second and third passageways, and, when the temperature rises, the element moves away from the seat to open the second and third passageways, whereby the thermostatic valve is made relatively simple in construction and small in size, free of erroneous operation, and is protected against the possibility of cold air intake despite a low atmospheric temperature, because, when the negative pressure in the intake manifold has dropped to a level low enough to stop the negative pressure motor due to full-load operation of the engine while the negative pressure motor is running with cold intake air, the check valve closes to keep off the motor from such a low negative pressure.

Another object of the invention is to provide a highly reliable thermostatic valve, in which the abovementioned valve element is movable into and out of engagement with the valve seat located at a point communicated with the first opening or openings to open and close the second and third passageways and control the air supply to the negative pressure motor and the intake manifold, whereby, unlike the conventional thermal expandable element type thermostatic valve in which the valve element is slidingly moved within the valve body the inner surface of which serves as the valve seat to control the air flow to the negative pressure motor and the intake manifold, the valve element is more positively engaged with the valve seat and, when not needed, the air supply to the negative pressure motor and the intake manifold is shut off.

DETAILED DESCRIPTION OF PREFERRED EMBODIMENTS

Figure 1:
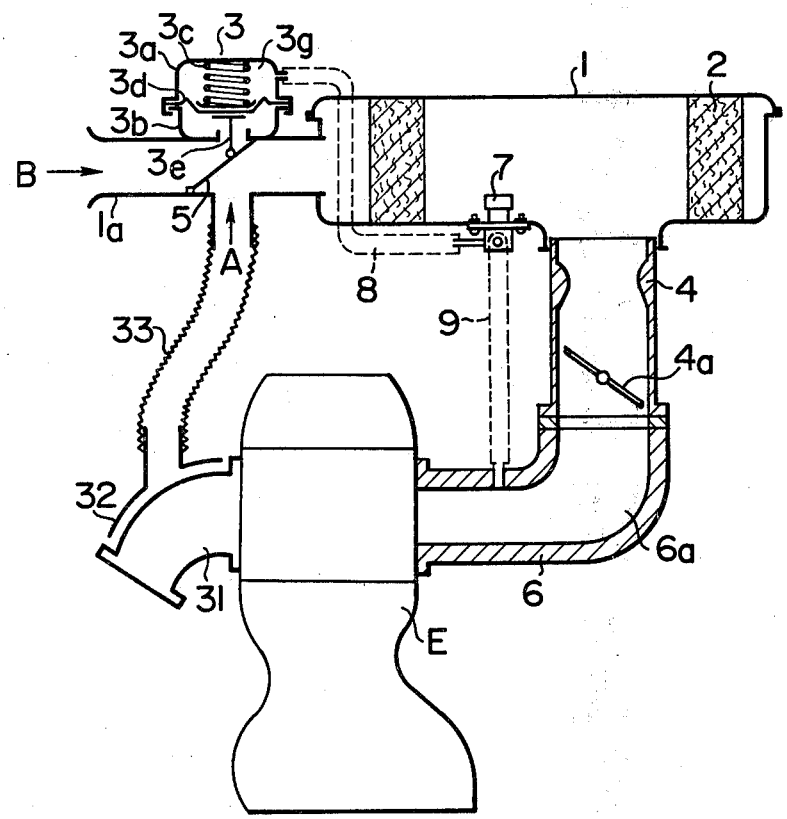
FIG. 1 is a schematic view partly in section of an internal combustion engine incorporating a thermostatic valve according to this invention.
Figure 2:
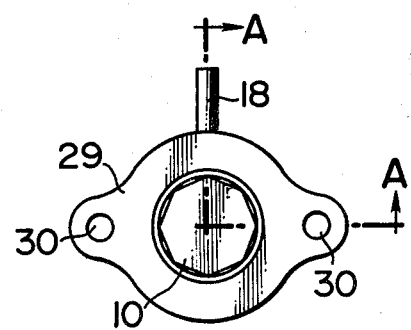
FIG. 2 is a front view of a thermostatic valve embodying the invention.

Referring to FIG. 1, there are shown an air cleaner 1 loaded with a filter element 2, and a negative pressure motor 3 comprising upper and lower housing members, 3a, 3b, a spring 3c, a diaphragm 3d, and a rod 3e. The negative pressure motor 3, which enables a switching valve 5 installed in the air inlet tube 1a of the air cleaner 1 to regulate the mixing proportions of hot air A and cold air B to be fed to the carburetor 4 or switch from hot air supply to cold air supply or vice versa, is controlled itself by the negative pressure applied to its negative pressure chamber 3g from the intake manifold space 6a on the downstream side of the throttle valve 4a. The intake manifold leading to an internal combustion engine E is generally indicated at 6. The hot air A, or air heated by a heat collecting plate 32 covering the upper portion of the exhaust manifold 31 of the engine, is conducted to the air inlet tube 1a through a hose 33. A thermostatic valve 7 is inserted in and connected to a point of a negative pressure line midway between the negative pressure motor 3 and the intake manifold space 6a. Numerals 8 and 9 indicate hoses connected to the valve so as to form the negative pressure line.

The construction of the thermostatic valve 7 will now be described with reference to FIGS. 2 through 5. Throughout these figures, 10a is a heat-sensing head of copper or other heat-conducting metal, 10b is a thermally expandable element, such as a wax, which increases or decreases its volume with a change in temperature, and 10c is a piston rod slidably inserted through a bore of a housing 10d and is actuated by the thermally expandable element 10b. A temperature sensor 10, consisting of the components above described, is screwed in a housing 15 of a synthetic resin. The housing 15 has an aperature or aperatures 11 formed in the surrounding wall and open to the atmosphere, and also has a hole 12 formed in the lower center of the housing. The hole 12 is large enough to permit the reciprocating motion of the piston rod 10c, and a flat valve seat 13 is formed in a portion communicated with the hole 12. On the opposite end of the hole is formed a shoulder 14. A synthetic resin casing 16 is hermetically joined, for example by ultrasonic welding, to the housing 15 to provide the major contour of the thermostatic valve 7. The casing 16 includes a pipe portion 18 formed on one side in communication with the negative pressure motor 3, the hollow of the pipe portion being tapered to a constriction 17, for example, about 0.7 mm in diameter. A valve element 20, made of a metal or synthetic resin to a generally T-shaped cross section, has a center recess 21 on its top. A valve seat 22 of a rubber material, for example, having a flat, disk-like contour 22a is affixed, for example by thermal forming, to the flat top surface surrounding a rim of the recess 21. The valve element 20 also includes a stepped flanged portion 23 forming its outer periphery. The stem 24 of the T-shaped valve element 20 has an enlarged portion 24a 3.9 mm in diameter, a tapering portion 24b, and a small-diameter portion 24b, and a small-diameter portion 24c having a diameter of 2 mm. The valve element 20 is loaded with a spring 25 and accommodated together in the casing 16, in such a manner that the flat surface 22a of the valve seat 22 is in intimate facial contact with the valve seal 13 of the housing 15 and that the recess 21 is urged against the lower end of the piston rod 10c of the temperature sensor 10. A bell-shaped partition member 26 of a synthetic resin has a 4 mm-dia. hole 27 in the center, and a flange 28 on the periphery. This partition member 26 is also housed in the casing 16, with its flange 28 pressed tightly against a bottom plate 50 of the casing by the spring 25. The bottom plate 50 has a center hole 51 and an additional hole or holes 52 around the center hole. A check valve 53 of an inverted mushroom-like contour comprising a concave portion 53a large enough to cover the hole or holes 52 and a stem 53b of a diameter larger than the inside diameter of the center hole 51 is secured to the bottom plate 50, with the stem 53b inserted through the hole 51 toward the partition member 26 so as to permit one-way flow of air from the space formed in the bell-shaped partition member 26 to the outside.

To the lower end of the casing 16 is hermetically joined, by ultrasonic welding or the like, a casing 54 of a synthetic resin which is integrally formed with a pipe 19 leading to the intake manifold 6.

A flange 29 is formed integrally on the upper periphery of the casing 16, and it has a plurality of holes 30 through which bolts and nuts (not shown) are to be inserted to secure the thermostatic valve to the air cleaner 1.

The partition member 26 is so disposed as to provide a partition between the apertures 11 of the housing 15 and the pipe 19 of the casing 54 and also between the pipe 18 of the casing 16 and the pipe 19. Thus, inside the casing 16, there are formed a first passageway communicating the pipe 18 with the pipe 19 through the hole 27 of the partition member 26 and the holes 52 of the bottom member 50, a second passageway connecting the apertures 11 with the pipe 18, and a third passageway communicating the apertures 11 with the pipe 19 through the hole 27 of the partition member 26 and the holes 52 of the bottom plate 50.

The operation of the device with the foregoing construction will now be explained. When the atmospheric temperature is low, as in winter, the temperature of air drawn by suction is low too and, if admitted direct, the cold air would cause malfunctioning of the engine E. The low atmospheric temperature keeps the thermally expandable element 10b of the temperature sensor 10 unexpanded and keeps the piston rod 10c inoperative. Therefore, the valve seat 13 of the housing 15 and the flat surface 22a of the valve element 20 are kept in close contact under the urging of the spring 25, and the second and third passageways remain closed. As the engine in this state starts for part-load operation, a sufficiently high negative pressure is produced in the intake-manifold portion 6a to open the check valve 53, opening the first passageway that connects the pipes 18 and 19 via the holes 52 of the bottom plate 50. Consequently, the negative pressure from the intake manifold space 6a is transmitted through the pipe 18 and applied to the negative pressure chamber 3g of the negative pressure motor 3, causing the latter to move the switching valve 5 to the position shown in FIG. 1. As a result, hot air A alone is admitted to the carburetor 4.

When the engine is shifted for a full-load run while it is being supplied with the hot air A due to the low atmospheric temperature, the negative pressure in the intake manifold space 6a decreases. Because this pressure is lower than the negative pressure in the pipe 18, the open check valve 53 is closed and the negative pressure in the chamber 3g of the negative pressure motor 3 is kept unchanged, with the consequence that the switching valve 5 remains in the position of FIG. 1 to permit continued supply of the hot air A to the carburetor 4.

Figure 3:
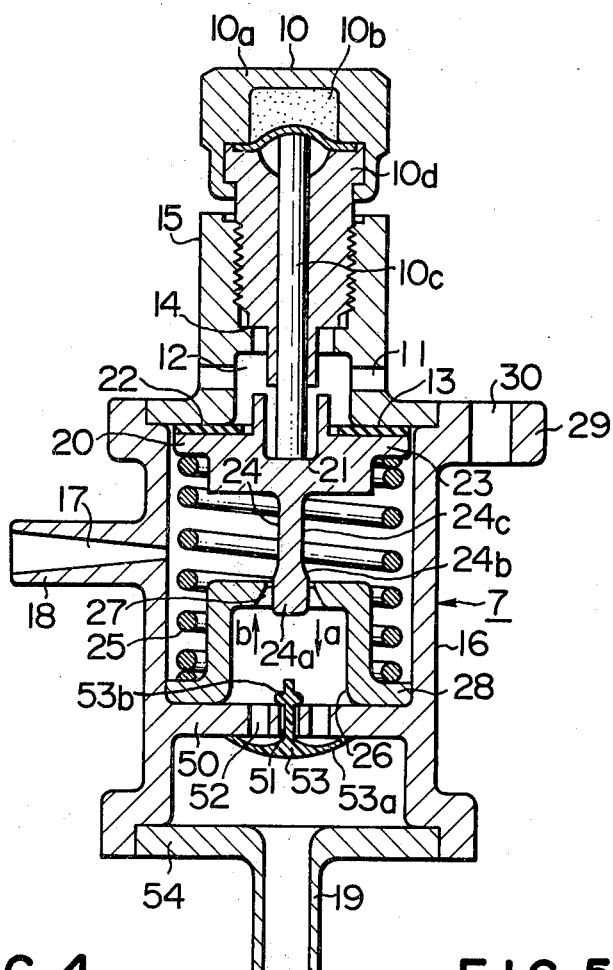
FIG. 3 is a sectional view taken along the line A—A in FIG. 2.
Figure 4:
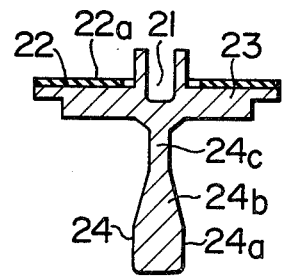
FIG. 4 is a sectional view of a valve element of the valve shown in FIG. 3.
Figure 5:
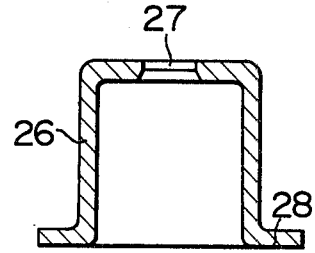
FIG. 5 is a sectional view of a partition for the valve shown in FIG. 3.

With an increase of the atmospheric temperature, for example to 27° C. or upwards, the thermally expandable element 10b of the temperature sensor 10 expands, forcing the piston rod 10c downward, together with the recess 21 of the valve element 20, in the direction of an arrow a, thus moving the valve element 20 downwardly away from the valve seat 13 and opening the second and third passageways. As a consequence, the negative pressure chamber 3g of the negative pressure motor 3 opens to the atmosphere through the apertures 11 and the pipe 18, thereby making the motor 3 inoperative. Also, the air from the apertures 11 enters the intake manifold space 6a by way of the hole 27 of the partition member 26 and the holes 52 of the bottom plate 50. During further rise of the ambient temperature, for example, within the range from 27° to 60° C., the piston rod 10c of the temperature sensor 10 is forced further downward in the direction a. However, because the enlarged portion 24a of the stem 24 of the valve element 20 is designed to fit in the center hole 27 of the partition member 26, the opening area of the hole 27 is limited and therefore the quantity of air flow from the apertures 11 of the housing 15 to the intake manifold space 6a is minimized. A further increase in the atmospheric temperature, in excess of 60° C. for example, is accompanied by a movement of the valve element 20 in the direction a to a lower position, where the tapered portion 24b of the stem 24 is in the center hole 27 of the partition member 26. Because of this setting, the clearance between the stem 24 of the valve element 20 and the hole 27 of the partition member 26 is increased. Thus, the quantity of air that flows from the apertures 11 of the housing 15 through the hole 27 of the partition member 26 and the holes 52 of the bottom plate 50 into the intake manifold passage 6a increases gradually in proportion to the increase in the ambient air temperature. As the temperature exceeds 100° C., for example, the valve element 20 is forced further downward in the direction a until the small-diameter portion 24c of the stem 24 comes into the center hole 27 of the partition member 26. This setting makes the clearance between the stem 24 and the surrounding wall of the center hole 27 constant, permitting air flow at a constant rate from the apertures 11 of the housing 15 into the intake manifold space 6a through the hole 27 of the partition member 26 and the holes 52 of the bottom plate 50. The air entering the intake manifold space 6a in this way compensates for the deficiency of ordinary suction air to the engien E. When the temperature of air being drawn into the air cleaner 1 has decreased due to the engine stop or an atmospheric temperature drop, the thermally expandable element 10b of the temperature sensor 10 contracts, allowing the valve element 20 to be pushed upward in the direction of an arrow b by the force of the spring 25. Accordingly, the opening area of the center hole 27 of the partition member 26 decreases and the quantity of air entering the intake manifold space 6a dwindles. A further temperature drop brings the flat surface 22a of the valve element 20 into close contact with the valve seat 13 of the housing 15, so that the second and third passageways are closed for resetting to the initial state (as shown in FIG. 3).

Figure 6:
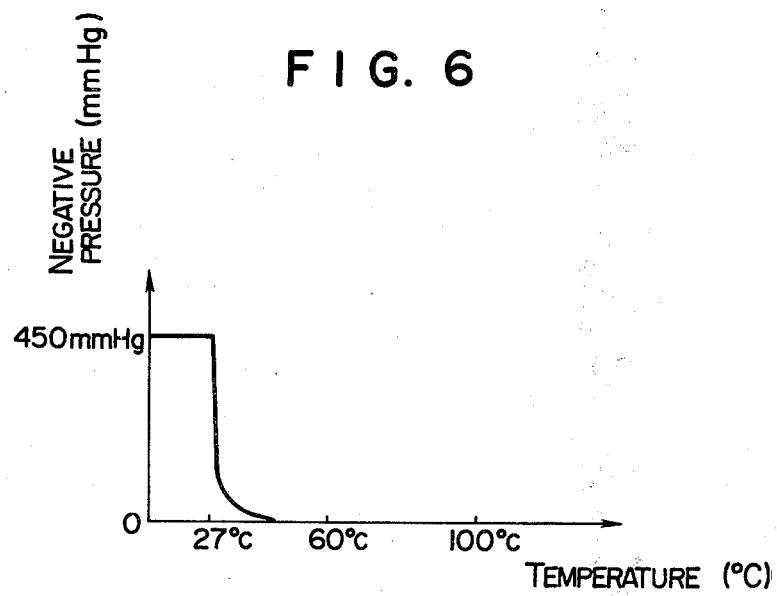
FIG. 6 is a characteristic curve showing the relation between the intake air temperature t and the negative pressure P in a negative pressure motor in connection with the use of the valve shown in FIG. 3.
Figure 7:
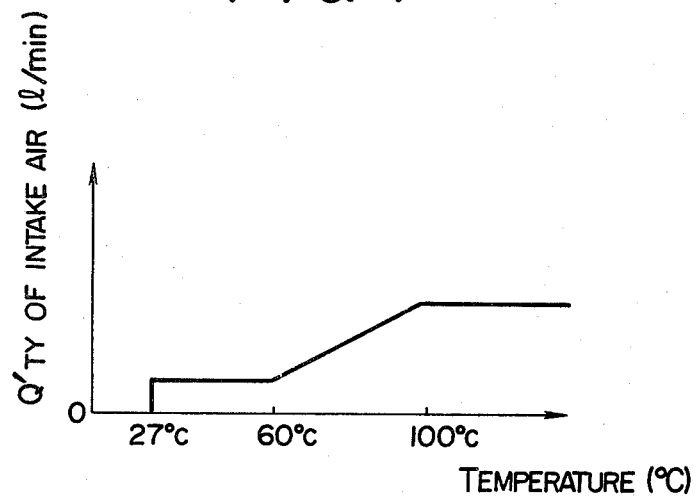
FIG. 7 is a characteristic curve showing the relation between the intake air temperature t and the quantity of air Q drawn by suction into the intake manifold in connection with the use of the valve shown in FIG. 3.

The characteristics of the thermostatic valve 7 embodied above are graphically represented in FIGS. 6 and 7. FIG. 6 is a characteristic curve illustrating the relation between the temperature t of intake air supplied to the engine E and the negative pressure P applied to the negative pressure motor 3 when the negative pressure in the intake manifold space 6a is constant (450 mmHg). FIG. 7 is a characteristic curve illustrating the relation between the temperature t of intake air for the engine E and the quantity of air Q supplied to the intake manifold space 6a when the negative pressure in the intake manifold space is constant (450 mmHg). The both characteristic curves are correlated.

Figure 8:
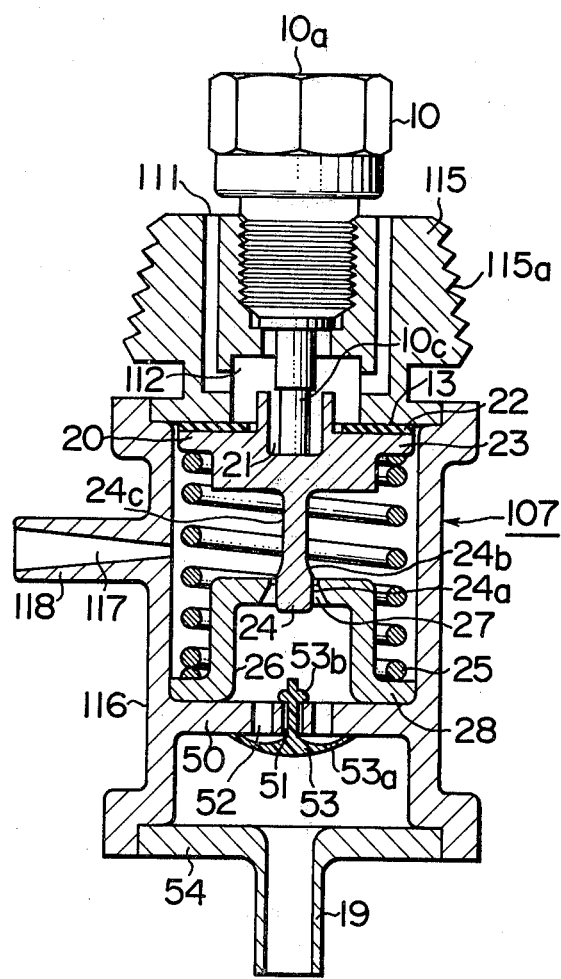
FIGS. 8 through 11 are partly sectional views of other embodiments of the valve of the invention.

FIG. 8 shows another embodiment of the invention, in which a housing 115 in thread engagement with the temperature sensor 10 is externally threaded at 115a for connection to the air cleaner 1 shown in FIG. 1, and also the housing 115 is formed with passages 111 axially along the temperature sensor 10. The thermostatic valve 107 includes a hole 112, a casing 116, a tapered constriction 117, and a pipe 118.

Figure 9:
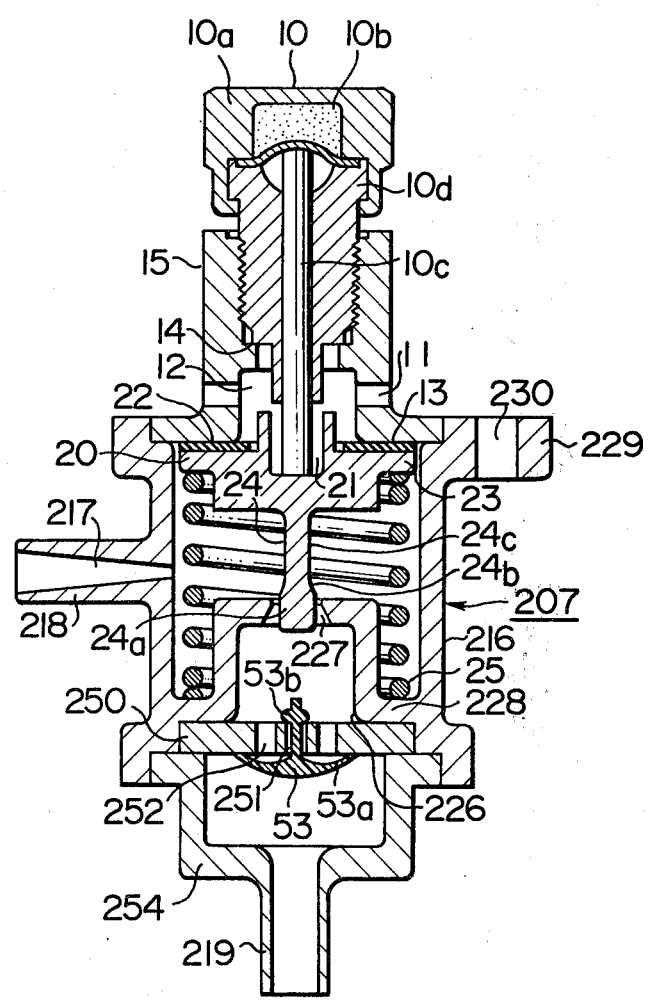

FIG. 9 shows still another embodiment of the invention, in which a partititon member 226 is formed in one piece with a casing 216, and a bottom plate 250 is a separate part instead of being integral with the casing as in the previous embodiments. The thermostatic valve 207 includes a tapered constriction 217, pipes 218, 219, a hole 227, flanges 228, 229, holes 251, 252, and a casing 254.

Figure 10:
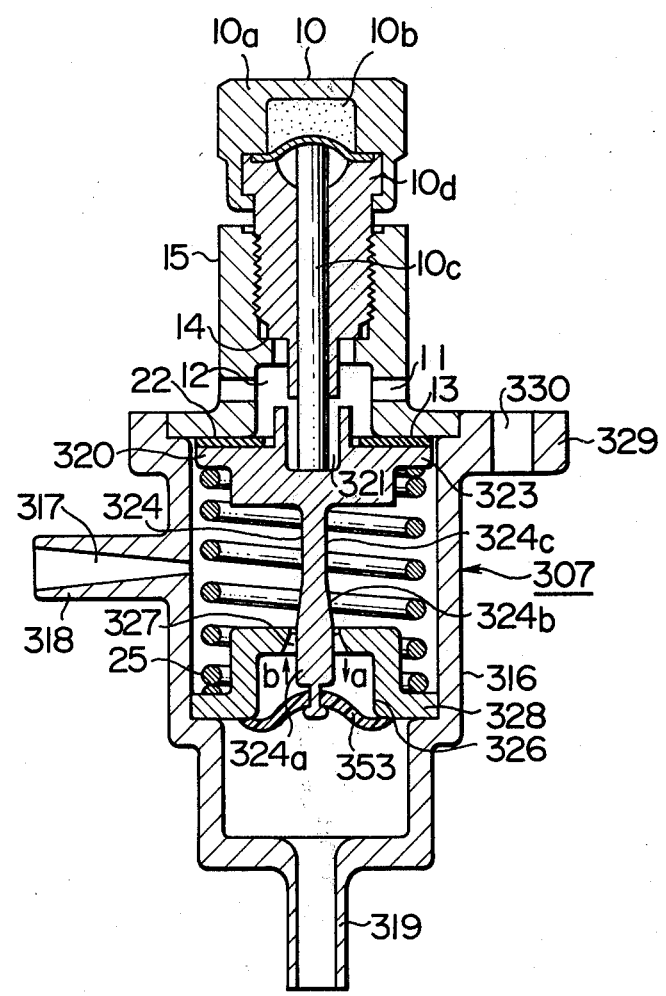

FIG. 10 shows yet another embodiment of the invention, in which the bottom plate of the preceding embodiments is omitted and a check valve 353 is secured to the lower end of the stem of a valve element 320, with the periphery of the check valve 353 kept in contact with the bottom of a flange 328 of a partition member 326. The thermostatic valve 307 includes a casing 316, a tapered constriction 317, pipes 318, 319, a recess 321, flanges 323, 329, a stem 324 having an enlarged portion 324a, a tapered portion 324b, and a small-diameter portion 324c, a center hole 327, and holes 330.

Figure 11:
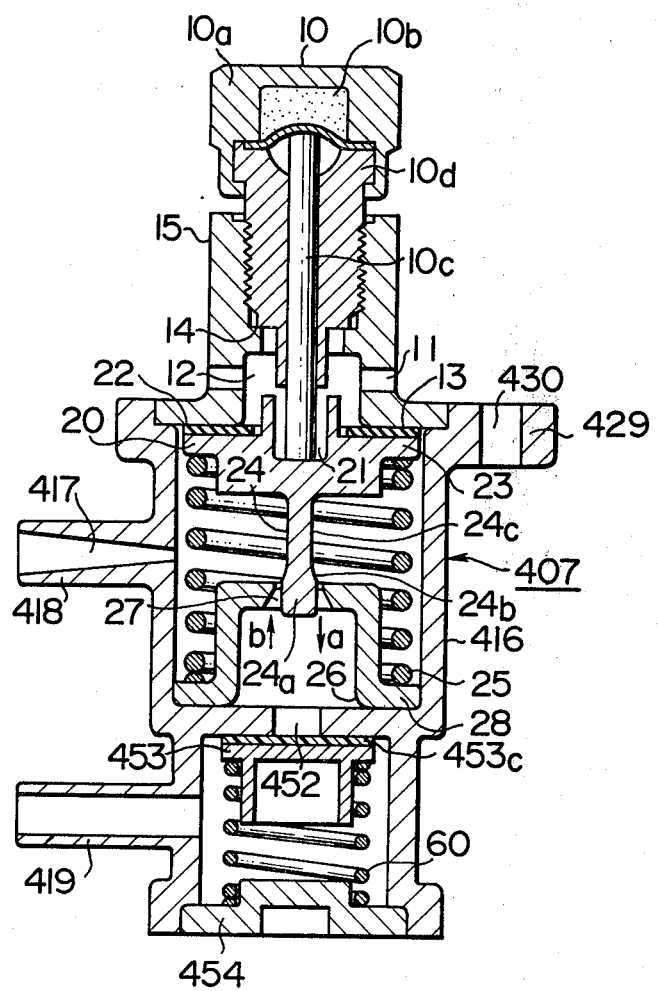

FIG. 11 shows a check valve assembly as a modification of the check valve in the embodiment shown in FIG. 3. This check valve 453 has a valve seat 453c on its upper surface, which is urged by a spring 60 against a hole 452 to close the same. The thermostatic valve 407 includes a casing 416, a tapered constriction 417, pipes 418, 419, a flange 429, holes 430, 453, and a bottom member 454.

Although the major components of the thermostatic valves in the embodiments so far described are made of plastics, they may, of course, be made of metals instead.

Also, while the temperature in the air cleaner is sensed in the foregoing embodiments as the temperature of intake air for supply to the engine E, the temperature in the engine room, which accommodates the engine E and governs the intake air temperature, may be sensed as well.

The characteristic curves in FIGS. 6 and 7 are given by way of example. Various other characteristic patterns may be attained by taking the valve-opening temperature of the valve element 20 and the diametral conditions of the stem 24 of the valve element 20 into consideration.

Further, it is to be noted that, whereas the stem 24 of the valve element used in all of the embodiments consists of an enlarged portion 24a, a tapered portion 24b, and a small-diameter portion 24c, the same purpose of the invention may be achieved by use of a valve element 20 with a straight stem 24.

What is claimed is:

1. A thermostatic valve for making intake air temperature compensation for an internal combustion engine by sensing a temperature increase in the intake air being supplied to the engine and, when necessary, directly supplying an additional amount of air to the intake manifold space downstream of the throttle valve in the carburetor of the engine, to make up for any deficiency of the intake air for the engine while, at the same time, controlling, according to the temperature change of the intake air, the introduction of a negative pressure from the intake manifold into a negative pressure motor which adjusts the temperature of the intake air being supplied to the carburetor, said valve comprising a temperature sensor including a piston rod to be actuated by a thermally expandable element whose volume increases or decreases with a temperature change of said intake air, a first opening leading to the atmosphere, a second opening leading to said negative pressure motor, a third opening leading to said intake manifold, a housing formed with said first to third openings and adapted to support said temperature sensor, a partition member disposed in said housing to provide partitions between said first and third openings and between said second and third openings, said partition member being formed with holes, a valve element so located in said housing as to be actuated by said piston rod of said temperature sensor, a valve seat provided in said housing to be in and out of contact with said valve element, and a check valve installed between said partition member and said third opening to open in one direction only, said housing being formed therein with a first passageway connecting said second and third openings through the holes of said partition member, a second passageway connecting said first and second passageways, and a third passageway connecting said first and third openings through said holes of said partition member, said first passageway being opened when the negative pressure in said intake manifold acting upon said check valve is high enough to open said valve and closed when the negative pressure acting upon said check valve becomes lower than the negative pressure in said second opening and closes said check valve, said second and third passageways being opened and closed by said valve element, in such a manner that, when the intake air temperature is low, said valve element is in contact with said valve seat, thus closing said second and third passageways and, when the temperature increases, said valve element moves away from said valve seat to open said second and third passageways.

2. A thermostatic valve according to claim 1, wherein said housing is externally threaded for thread engagement with the body of said air cleaner, and said first opening is formed in said housing in parallel with the axis of said temperature sensor.

3. A thermostatic valve according to claim 1, wherein said partition member is formed in one piece with the casing constituting the thermostatic valve body.

4. A thermostatic valve according to claim 1, wherein said check valve is fixedly secured to the lower end of said valve element.

5. A thermostatic valve according to claim 1, wherein said check valve has a valve seat on the upper surface thereof, which seat is adapted to be urged by a spring to open said holes of said partition member.

* * * * *